Oct. 13, 1959 W. I. HANRAHAN 2,908,338
FLUTED COULTER DISC
Filed April 1, 1954
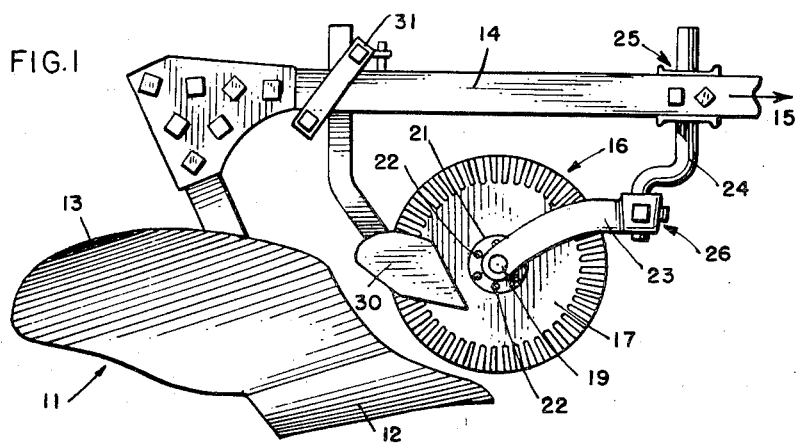
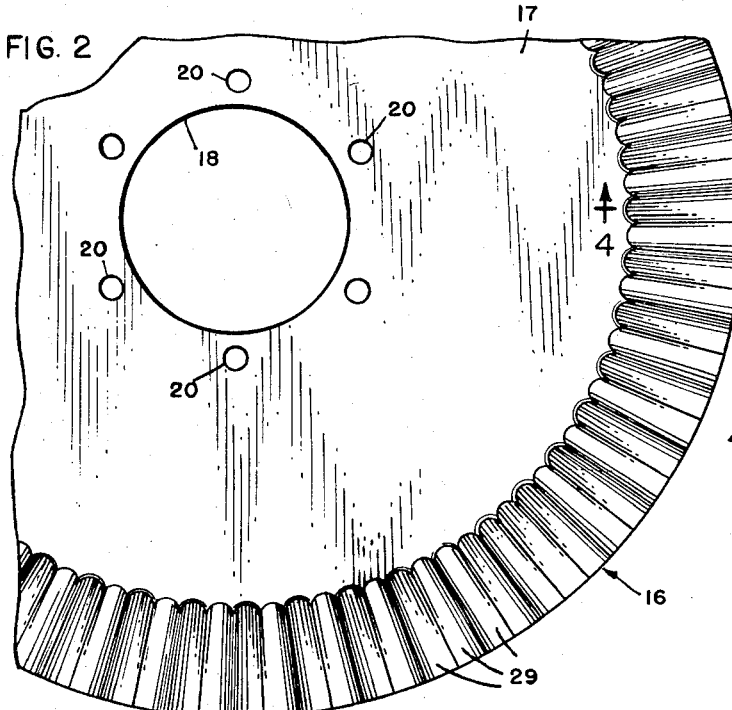
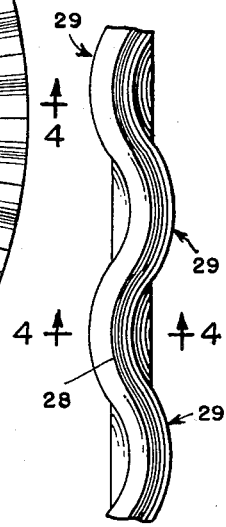
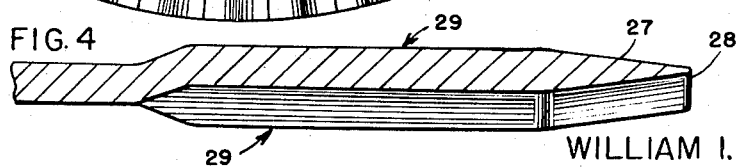
INVENTOR:—
WILLIAM I. HANRAHAN
BY:—
Marzall, Johnston, Cook & Root
ATT'YS

United States Patent Office 2,908,338
Patented Oct. 13, 1959

2,908,338

FLUTED COULTER DISC

William I. Hanrahan, Valparaiso, Ind.

Application April 1, 1954, Serial No. 420,361

10 Claims. (Cl. 172—555)

The present invention relates in general to earth-working equipment, and has more particular reference to an improved coulter blade of the sort particularly well-suited for mounting in plows and other earth-working equipment, including tillers, planters, fertilizer distributors and the like.

Coulter blades are commonly employed in earth-working apparatus, including plows and other earth cutting, scraping, or moving devices, for the purpose of cutting into the ground in advance of the principal earth-moving device with which used, in order to sever, cut apart, and thus spread weeds, ground trash, and other surface litter, in advance of the principal earth-moving device, such as a plowshare. Coulter blades are commonly employed in the form of discs turnably mounted in the structure of the earth-working apparatus in position to roll upon and bite into the surface of the ground being worked immediately in advance of the principal earth-moving devices of the apparatus, to thus intersect the surface of the earth being worked, as well as the overlying surface trash in alignment wtih the plowshares or other principal earth-moving devices constituting the earth-working apparatus.

Where employed in moist earth, disc coulters become coated and more or less heavily fouled with soil which tends to adhere in ever increasing quantity upon the opposite sides of the coulter disc, thereby impairing its trash severing function by causing the fouled blade to ride upwardly over ground trash. As a consequence it is common to provide scraper means in position continuously to shave off soil accumulations upon the side surfaces of the coulter disc. Furthermore, the peripheral ground engaging and cutting edge of a coulter disc tends rapidly to become dulled, blunted and nicked as the result of striking upon rocks and other hard objects encountered in the performance of its trash cutting function. Ordinarily it is not considered economically expedient to maintain the coulter in highly sharpened condition because of the labor and time loss involved in removing a dulled coulter blade for resharpening, the blades becoming nicked and relatively dull almost as soon as they are put into operation.

An important object of the present invention is to provide a coulter blade comprising a disc having a peripheral cutting edge formed in novel fashion, whereby the same is substantially self-cleaning at and adjacent the cutting edge of the blade; a further object being to provide a cutting edge construction for a coulter disc whereby the disc has superior trash cutting characteristics and maintains its cutting ability to a high degree even after the edge has become nicked and substantially dull.

A further object is to provide a coulter disc in which the marginal cutting edges of the disc are peripherally fluted radially of the disc, whereby the peripheral portions of the blade are alternately offset progressively throughout the circumference of the blade, to provide a sinuous cutting edge at the margin of the disc.

A further object is to provide a coulter disc having marginal portions radially fluted to provide sinusoidal sectional configuration in the disc at and throughout its peripheral edge portions; a further object being to extend the radially fluted portions inwardly of the peripheral edge of the disc through a substantial distance, of the order of, say two inches, to afford a substantial self-cleaning fluted zone in the coulter disc at and inwardly of its peripheral cutting edge; a further object being to form the fluted portions by oppositely offsetting the material of the disc, through a displacement of the order of one-half the thickness of the disc, so that the sinuous cutting edge of the coulter blade lies substantially within the planes which define the opposite faces of the disc inwardly of the peripheral fluted portions thereof.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a side view of an earth-working device fitted with a coulter blade embodying the present invention;

Fig. 2 is an enlarged face view of a portion of the coulter blade shown in Fig. 1;

Fig. 3 is an enlarged edgewise view of a portion of the blade shown in Fig. 2; and Fig. 4 is a sectional view taken substantially along the lines 4—4 in Figs. 2 and 3.

To illustrate the invention, the drawings show earth-working equipment 11 comprising a plow embodying a plowshare 12 and mould board 13 suitably secured on a frame embodying a plow beam 14 adapted for connection with suitable tractor means for drawing the plow in the direction illustrated by the arrow 15 in Fig. 1. The equipment 11 includes a coulter blade 16 made in accordance with the teachings of the present invention and comprising a preferably steel disc 17 of thickness of the order of 3/16±1/8 inch, having a circular peripheral edge and formed with a central circular opening 18, concentric with the peripheral edge, for receiving an axle 19, and spaced holes 20 formed in the disc 17 immediately outwardly of the opening 18 for the reception of clamping bolts.

The axle 19 may be provided with a hub portion 21 provided with holes in position to align with the holes 20 of the coulter blade so that the disc 17 may be secured to the axle 19, in coaxial alignment therewith by means of fastening bolts 22 penetrating the holes 20 and the aligned holes of the hub 21, the axle 19 preferably including a portion adapted to extend within and snugly fit the blade opening 18. The axle 19, in turn, may be suitably journaled in a coulter blade support frame comprising an arm 23 secured on the plow beam 14 in position to support the coulter blade immediately in front of and in alignment with the principal earth-moving element of the equipment 11, said element in the illustrated embodiment comprising the plowshare 12 and mould board 13.

The coulter mounting arm 23 may be secured upon a support shank 24 which, in turn, may be fastened firmly upon the beam 14 as by means of a clamp structure 25, suitable clamping means 26 being also preferably provided for securing the arm 23 on the shank 24 so that, by relative adjustment of the parts 23, 24 and the parts 24 and 14, the coulter blade 16 may be securely fastened in the equipment 11 in desired adjusted position with respect to the plowshare and mould board.

The coulter disc, as indicated more especially in Fig. 1, may be of conventional size, that is to say, may have diameter of the order of sixteen inches, it being the common practice, at the option of the user, to employ coulter blades of desired diametral size within the range from twelve to twenty inches, although blades of the sixteen inch diameter size are perhaps most commonly used. The coulter disc 17 preferably comprises a sheet or plate of metal, such as steel, having thickness of the order of one-eighth of an inch, the marginal portions of the disc being tapered as at 27 to form a relatively sharp peripheral ground-engaging and cutting edge 28. At and inwardly of the cutting edge 28, the marginal edge portions of the disc 17 are formed with radial flutes 29 by offsetting said marginal plate portions with respect to the medial portions of the plate, alternate flutes being thus oppositely offset so that said marginal fluted portions of the disc have preferably sinusoidal sectional configuration, the cutting edge 28 having like sinuosity whereby said cutting edge embodies a generally zig-zag configuration around and laterally of the disc 17.

As shown more particularly in Fig. 2, the conventional sixteen inch diameter coulter disc 17 may be provided with about ninety-six flutes 29, or forty-eight ripples each comprising a pair of adjacent oppositely offset flutes. Where a disc is sixteen inches in diameter is thus formed with ninety-six flutes, the width of each flute will be of the order of half an inch, at the peripheral edge of the disc, such width being best adapted to the operation of the coulter in the improved trash cutting and ground engaging fashion contemplated. The precise width of the flutes is not especially critical. Indeed, coulter discs having flutes of width within the range between seven-sixteenths and five-eighths of an inch display the desirable trash cutting and ground engaging effects to a satisfactorily useful extent; but said desirable effects substantially disappear if the width of the flutes be increased above, say, seven-eighths of an inch, or reduced below, say, three-eighths of an inch. A coulter disc of conventional sixteen inch diameter size accordingly will perform the functions herein contemplated, in satisfactory fashion, so long as it has between, say, eighty and one hundred twelve flutes formed therein, the desirable characteristics being substantially absent in sixteen inch discs formed with less than sixty or more than one hundred thirty-five flutes. A disc twelve inches in diameter will perform the desired functions adequately so long as it embodies between, say, sixty and eighty-four flutes, the desirable characteristics being substantially absent in twelve inch discs having less than forty-five or more than one hundred flutes. A twenty inch disc will properly perform the functions herein contemplated so long as it has between, say, one hundred and one hundred forty flutes formed therein, the desirable characteristics being substantially absent in twenty inch discs formed with less than seventy or more than one hundred seventy-five flutes. Optimum trash cutting and ground gripping characteristics thus are displayed where the number of flutes contained in the coulter disc is equal to six times the diameter of the disc expressed in inches, the desirable characteristics being usefully present where the number of flutes lies within the range of from five to seven times the disc diameter stated in inches, and being substantially absent in coulter discs in which the number of flutes is more than eight or less than four times the diameter of the disc stated in inches.

While the invention is not necessarily so limited, Fig. 4 shows an arrangement in which the flutes 29 are offset to an extent such that the sinuous cutting edge 28 lies within the confines of the opposite faces of the unfluted portion of the disc 17; that is to say, the flutes may be offset within the range between 1/16 and 5/16 of an inch; optimum results being obtained with flutes offset a distance of 3/16 of an inch. The fluted portion of the disc preferably extends inwardly of the peripheral cutting edge 28 for a distance of the order of one-fourth the radial dimension of the disc, said disc inwardly of its marginal fluted portion being preferably smooth and flat, although the invention is not necessarily limited to a flat configuration of the disc, which, if desired, may be of slightly dished configuration.

The foregoing fluted edge configuration in a coulter blade renders the same substantially self-cleaning as the blade rolls upon and bites into the ground surface regardless of the moisture content of the soil. As a consequence, a coulter blade fluted as described herein will maintain at least its fluted portions in substantially clean condition even when working in substantially moist earth. Inwardly of the fluted portion the relatively smooth surfaces of the disc may accumulate soil thereon to some extent. Accordingly, if desired, means may be provided for scraping the disc inwardly of its marginal fluted portions. This may be accomplished by mounting a scraper blade 30 on the beam 14, as by means of a suitable attaching clamp 31. The present invention, however, is not necessarily limited to the employment of a scraper blade in conjunction with the fluted coulter disc since, under nearly all conditions of operation, the accumulation of soil on the coulter disc inwardly of its fluted portions is negligible.

It has been found that the sinuous peripheral cutting edge 28 of the present invention is exceedingly efficient for trash cutting purposes, the cutting ability of the sinuous edge 28 being very substantially and markedly better than that of the straight circular cutting edge configuration employed in conventional coulter blades; and the sinuous edge 28 of the present invention, indeed, appears to have self-sharpening characteristics not found in the straight circular edges of conventional coulter blades.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A coulter comprising a metal plate having a circular peripheral cutting edge, the marginal portions of said plate at and inwardly of said edge being offset alternately in opposite directions to provide radial flutes, said cutting edge lying substantially within confines defined between the planes of the opposite faces of the plate inwardly of said flutes.

2. A coulter comprising a metal plate of diameter within the range from twelve to twenty inches, inclusive, and thickness of the order of three-sixteenths ± one-eighth inch, said plate having a circular peripheral cutting edge, the marginal portions of said plate at and inwardly of said edge being offset alternately in opposite directions to provide radial flutes each having width within the range between three-eighths and seven-eighths of an inch at said peripheral edge.

3. A coulter comprising a metal plate of diameter within the range from twelve to twenty inches, inclusive, and having a circular peripheral cutting edge, the marginal portions of said plate at and inwardly of said edge being offset alternately in opposite directions to provide radial flutes each having width of the order of one-half inch at said peripheral edge.

4. A coulter comprising a metal plate of diameter within the range from twelve to twenty inches, inclusive, and having a circular peripheral cutting edge, the marginal portions of said plate at and inwardly of said edge being offset alternately in opposite directions to provide radial flutes each having width equal to 17/32 ± 3/32 inch at said peripheral edge.

5. A coulter comprising a metal plate of diameter within the range from twelve to twenty inches, inclusive, and having a circular peripheral cutting edge, the marginal portions of said plate at and inwardly of said edge being offset alternately in opposite directions to provide radial flutes each having width, at said peripheral edge, such that the number of flutes formed in the plate is of the order of six times the diameter of the plate measured in inches.

6. A coulter comprising a metal plate of diameter within the range from twelve to twenty inches, inclusive, and having a circular peripheral cutting edge, the marginal portions of said plate at and inwardly of said edge being offset alternately in opposite directions to provide radial flutes each having width, at said peripheral edge, such that the number of flutes formed in the plate is within the range between five and seven times the diameter of the plate measured in inches.

7. A coulter comprising a metal plate of diameter within the range from twelve to twenty inches, inclusive, and thickness of the order of three-sixteenths ± one-eighth inch, said plate having a circular peripheral cutting edge, the marginal portions of said plate at and inwardly of said edge being offset alternately in opposite directions to provide radial flutes each having width within the range between five-eighths and seven-sixteenths of an inch at said peripheral edge, successive flutes being mutually offset through a distance of the order of three-sixteenths of an inch.

8. A coulter comprising a metal plate of diameter within the range from twelve to twenty inches, inclusive, and having a circular peripheral cutting edge, the marginal portions of said plate at and inwardly of said edge being offset alternately in opposite directions to provide radial flutes each having width within the range between five-eighths and seven-sixteenths of an inch at said peripheral edge, successive flutes being mutually offset through a distance of $3/16 \pm 1/8$ inch.

9. A coulter comprising a metal plate of diameter within the range from twelve to twenty inches, inclusive, and having a circular peripheral cutting edge, the marginal portions of said plate at and inwardly of said edge being offset alternately in opposite directions to provide radial flutes each having width, at said peripheral edge, such that the number of flutes formed in the plate is within the range between five and seven times the diameter of the plate measured in inches, successive flutes being mutually offset through a distance of the order of three-sixteenths of an inch.

10. A coulter comprising a metal plate of diameter within the range from twelve to twenty inches, inclusive, and having a circular peripheral cutting edge, the marginal portions of said plate at and inwardly of said edge being offset alternately in opposite directions to provide radial flutes each having width, at said peripheral edge, such that the number of flutes formed in the plate is within the range between five and seven times the diameter of the plate measured in inches, successive flutes being mutually offset through a distance of $3/16 \pm 1/8$ inch.

References Cited in the file of this patent

UNITED STATES PATENTS

| | | |
|---|---|---|
| 246,651 | Alston | Sept. 6, 1881 |
| 323,343 | La Dow | July 28, 1885 |
| 323,344 | La Dow | July 28, 1885 |
| 489,206 | Poore | Jan. 3, 1893 |
| 1,150,064 | Rizor | Aug. 17, 1915 |
| 1,790,956 | Strandlund | Feb. 3, 1931 |
| 2,596,574 | Lutes | May 13, 1952 |

FOREIGN PATENTS

| | | |
|---|---|---|
| 150,176/19 | Australia | February 1953 |
| 590,435 | Great Britain | July 17, 1947 |